United States Patent [19]

Watanabe

[11] Patent Number: 4,630,078

[45] Date of Patent: Dec. 16, 1986

[54] LIQUID RECORDING HEAD

[75] Inventor: Kenjiro Watanabe, Hiratsuka, Japan

[73] Assignee: Canon Kabushiki Kaisha, Tokyo, Japan

[21] Appl. No.: 712,661

[22] Filed: Mar. 18, 1985

[30] Foreign Application Priority Data

Mar. 30, 1984 [JP] Japan .................................. 59-60578
Mar. 30, 1984 [JP] Japan .................................. 59-60579

[51] Int. Cl.[4] .............................................. G01D 15/18
[52] U.S. Cl. .................................... 346/140 R; 346/75
[58] Field of Search ............................. 346/75, 140 R; 346/76 PH

[56] References Cited

U.S. PATENT DOCUMENTS

| | | | |
|---|---|---|---|
| 4,170,728 | 10/1979 | Flasck | 219/216 X |
| 4,368,476 | 1/1983 | Uehara et al. | 346/140 R |
| 4,390,884 | 6/1983 | Applegate et al. | 346/139 R X |
| 4,431,319 | 2/1984 | Karaki et al. | 400/124 X |
| 4,500,895 | 2/1985 | Buck et al. | 346/140 R |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A liquid ejection recording head includes orifices provided to discharge liquid and form flying droplets, an energy generating member for generating energy utilized to form the droplets, and electrical contacts provided on the same side as a surface in which the orifices are provided for inputting an electrical signal to the energy generating member. The electrical contacts are provided above the orifices during the use of the head.

8 Claims, 4 Drawing Figures

LIQUID RECORDING HEAD

BACKGROUND OF THE INVENTION

1. Field of the Invention

This invention relates to a liquid ejection recording head and a liquid ejection recording apparatus.

2. Description of the Prior Art

Generally, in a liquid ejection recording apparatus, it is desirable for maintenance and interchange of the liquid ejection recording head (hereinafter referred to as the recording head) that the recording head be readily removable with respect to the carriage. Therefore, in order to supply a driving electric power and a signal to the recording head, it has been proposed to provide electrical contacts on the recording head and the carriage, respectively, so that when the recording head is mounted on the carriage, the electrical contacts of the two make contact with each other to thereby supply driving electric power and the recording signal to the recording head. Most recording heads are of the type which are mounted on the carriage and therefore, usually, the electrical contacts on the recording head side are provided on the lower portion of the recording head. Further, with a recording head in which an orifice surface provided with orifices for ejecting ink and an electrical wiring substrate having said electrical contacts are formed on the same plane, it is usually the case that the electrical contacts are provided below the orifice surface for the reason set forth above. Accordingly, with the apparatus according to the prior art, it has sometimes been the case that the electrical contacts are stained or corroded by ink flowing down from the orifices to thereby cause unsatisfactory contact, which leads to the impossibility of discharge or unstable discharge of the liquid (ink). Particularly, where the electrical contacts and the orifices are provided on the same surface, the electrical contacts have been liable to be stained or damaged to thereby cause the impossibility of discharge or the unstable discharge of the liquid.

SUMMARY OF THE INVENTION

It is therefore an object of the present invention to eliminate the above-noted disadvantages and to provide a liquid ejection recording apparatus which is capable of always realizing a stable liquid discharging condition.

It is another object of the present invention to provide a liquid ejection recording apparatus comprising a liquid ejection recording head mounted thereon and having orifices provided to discharge liquid and form flying droplets and an energy generating member for generating energy utilized to form said droplets and wherein electrical contacts for inputting an electrical signal to said energy generating member are provided on the same surface as a surface in which said orifices of said liquid ejection recording head are provided, said electrical contacts being electrically connected to electrical contacts on the apparatus side provided above said orifices when said liquid ejection recording head is mounted on said liquid ejection recording apparatus.

It is still another object of the present invention to provide a liquid ejection recording head having orifices provided to discharge liquid and form flying droplets and an energy generating member for generating energy utilized to form said droplets and wherein electrical contacts for inputting an electrical signal to said energy generaing member are provided on the same surface as a surface in which said orifices are provided, said electrical contacts being provided above said orifices during the use of the head.

DESCRIPTION OF PREFERRED EMBODIMENT.

An embodiment of the present invention will hereinafter be described specifically and in detail with reference to the drawings.

Figure 1:
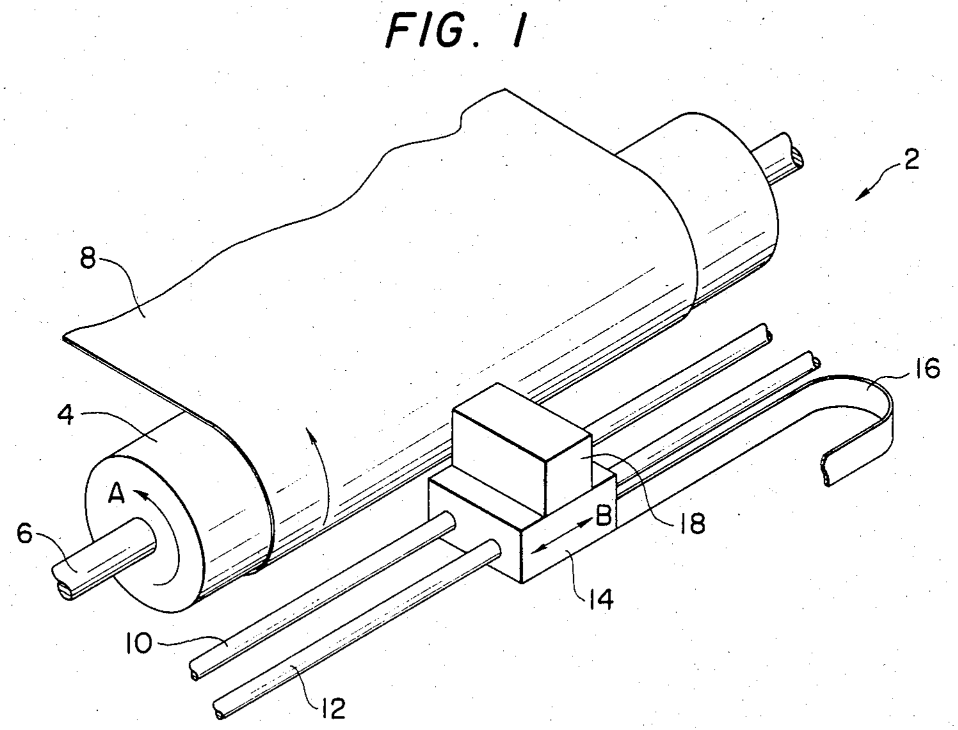
FIG. 1 is a schematic perspective view of a liquid ejection recording apparatus according to an embodiment of the present invention.
Figure 2:
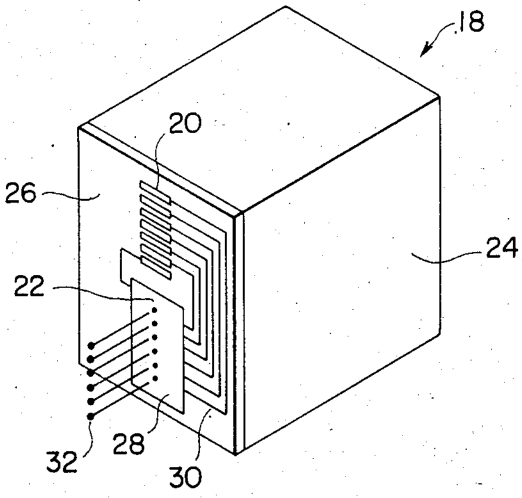
FIG. 2 is a schematic perspective view of a liquid ejection recording head.

FIG. 1 is a schematic perspective view of a liquid ejection recording apparatus according to the present embodiment. In FIG. 1, reference numeral 4 designates a platen rotatable about a platen shaft 6 in the direction of arrow A, and reference numeral 8 denotes a recording medium such as printing paper (hereinafter referred to as paper). The paper 8 is rotated in the same direction as the direction of rotation of the platen 4 when the platen is rotated. Reference numerals 10 and 12 designate guide shafts. A carriage 14 is provided for sliding movement relative to the guide shafts 10 and 12 in the direction of arrow B. Reference numeral 16 denotes a flexible cable for transmitting a driving electric power and a signal to the carriage 14. Reference numeral 18 designates a liquid ejection recording head (hereinafter referred to as the recording head) mounted on the carriage 14. FIG. 2 is a schematic perspective view of the recording head 18. As shown in FIG. 2, in this recording head 18, recording head side electrical contacts 20 (hereinafter referred to as the first contacts) for transmitting a driving electric power and a signal to the recording head 18 are provided on the same plane as orifices 22 and above the orifices 22. In FIG. 2, reference numeral 24 designates a liquid reservoir in which liquid such as ink is contained, reference numeral 26 denotes an electrical wiring substrate, reference numeral 28 designates an orifice plate, reference numeral 30 denotes wiring conductors, and reference numeral 32 designates discharged droplets such as ink.

The electrical wiring substrate 26 is for supplying a driving electric power to an energy generating element (not shown) in the recording head 18. The electrical contacts 20 are provided on the upper portion of the electrical wiring substrate 26, and the orifice plate 28 having the orifices 22 is provided below the electrical contacts 20.

The recording head 18 constructed as described above is mounted on the carriage (not shown) so that the carriage side electrical contacts are in contact with the first contacts 20. Thus, a driving electric power and a control signal are transmitted from the carriage side through the electrical contacts, the discharged droplets 32 are ejected from the orifices 22 and the recording is effected. At this time, the first contracts 20 are not stained by the ink flowing out of the orifices 22 because the first contacts 20 are positioned above the orifices 22.

Figure 3:
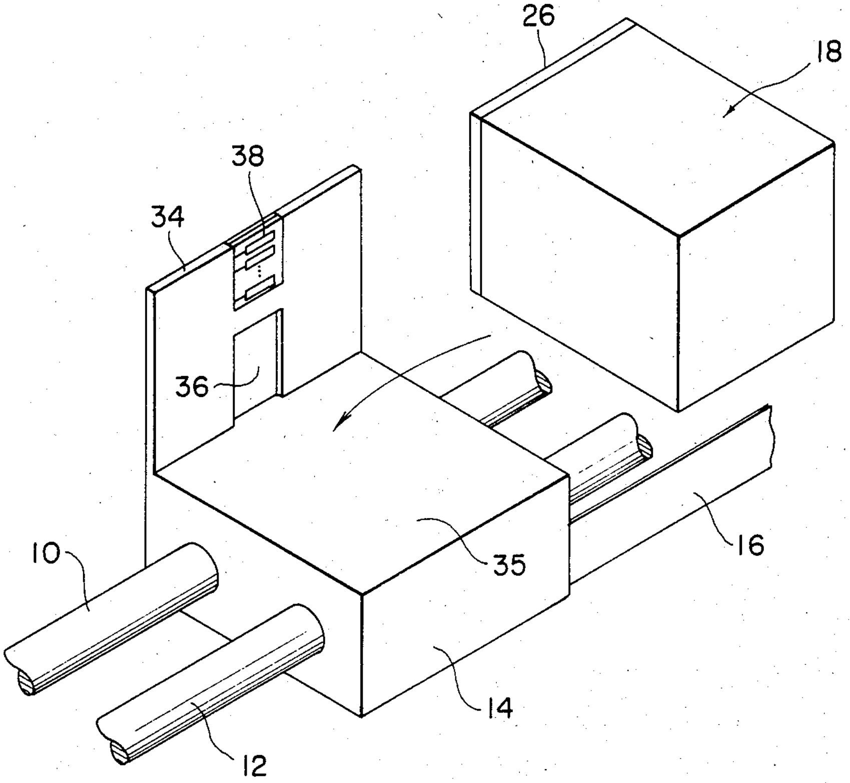
FIG. 3 is a schematic enlarged perspective view of the vicinity of a carriage.

FIG. 3 is a schematic enlarged perspective view of the vicinity of the carriage 14. An overhanging plate 34 is provided to the carriage 14 on that side thereof which is adjacent to the paper 8 (FIG. 1). To mount the recording head 18 on the carriage 14, the recording head 18 is placed on the upper surface 35 of the carriage 14, and the overhanging plate 34 and the electrical wiring substrate 26 are brought into coincidence with each other. A liquid ejection opening 36 is provided in the overhanging plate 34 so as to be coincident with the orifice plate 28 of the recording head 18, and carriage side electrical contacts 38 (hereinafter referred to as the second contacts) which are electrically in contact with the first contacts 20 are provided in the overhanging plate 34 above the liquid ejection opening 36 so as to correspond to the first contacts 20. When effecting the printing, as regards the driving electric power and control signal supplied through the flexible cable 16, the former is directly supplied to the second contacts 38 and the latter is converted into a driving signal voltage by a control circuit (not shown) in the carriage and supplied to the second contacts 38, whereafter they are transmitted to the first contacts 20 which are in contact with the second contacts 38, and then are input to the energy generating element, nd liquid (ink) is ejected from the orifices 22.

Also, to make the present invention more effective, it is preferable to lyophobically treat the portions in which the electrical contacts are provided and the other portions around said portions than the electrical contacts.

As described above specifically and in detail, according to the present invention, the electrical contacts are positioned above the orifices and therefore, the electrical contacts of the recording head are not stained or corroded by the ink flowing down from the orifices and thus, the electrical contacts can always keep a good contact state and as a result, the recording head can always provide a stable liquid discharging condition.

Also, according to the liquid ejection recording apparatus of the present invention, the electrical contacts on the apparatus body side are positioned above the liquid ejection opening and the orifices and therefore, the electrical contacts are not stained or corroded by the ink flowing down from the orifices. The electrical contacts of the recording head are neither stained or damaged by the ink and therefore, they can always keep a good contact state and as a result, a stable liquid discharging condition can always be obtained.

Figure 4:
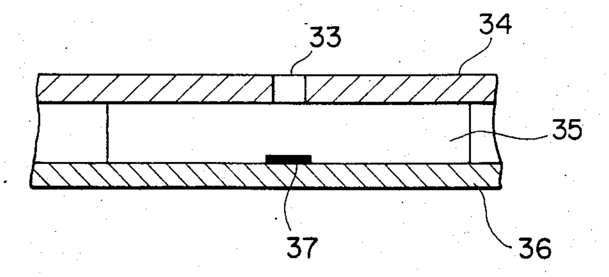
FIG. 4 is shows the construction of a conventional liquid ejection recording head.

FIG. 4 shows the construction of a liquid ejection recording apparatus, in which reference numeral 33 designates an orifice for discharging a liquid flying droplet, reference numeral 34 designates an orifice plate, reference numeral 35 designates a flowing path, reference numeral 36 designates a supporting member for supporting the apparatus and reference numeral 37 designates an energy generating member for generating a power which is used for forming a liquid flying droplet.

What I claim is:

1. A liquid ejection recording head adapted to be mounted to a liquid ejection recording apparatus, said head comprising:

orifices for discharging liquid as flying droplets;

an energy generating member for generating energy utilized to form said droplets;

electrical contacts, disposed on the same side of said head as said orifices, for inputting an electrical signal to said energy generating member; and mounting means for mounting said head to said liquid ejection recording apparatus, said mounting means being arranged such that all of said electrical contacts are disposed above said orifices when said head is mounted on said liquid ejection recording apparatus.

2. A liquid ejection recording head according to claim 1, further comprising a liquid reservoir for containing said liquid therein.

3. A liquid ejection recording head according to claim 1, wherein said orifices and said electrical contacts are on the same surface.

4. A liquid ejection recording head according to claim 1, wherein the vicinity of said electrical contacts is subjected to a lyophobic treatment.

5. A liquid ejection recording apparatus comprising:

a liquid ejection recording head mounted thereon and having orifices for discharging liquid as flying droplets;

an energy generating member for generating energy utilized to form said droplets; and electrical contacts, disposed on the same side of said liquid ejection recording head as said orifices, for inputting an electrical signal to said energy generating member, said electrical contacts being electrically connected to electrical contacts on the apparatus side and all of said electrical contacts being disposed above said orifices when said liquid ejection recording head is mounted on said liquid ejection recording apparatus.

6. A liquid ejection recording apparatus according to claim 5, wherein said liquid ejection recording head has a liquid reservoir for containing said liquid therein.

7. A liquid ejection recording apparatus according to claim 5, wherein said orifices and said electrical contacts are on the same surface.

8. A liquid ejection recording apparatus according to claim 5, wherein the vicinity of said electrical contacts is subjected to a lyophobic treatment.

* * * * *